United States Patent [19]
Bell, III et al.

[11] 4,090,067
[45] May 16, 1978

[54] OPTICAL DATA COMMUNICATION SYSTEM

[75] Inventors: William W. Bell, III, Bayside; Lamar Cox, Hempstead; William L. Rubin, Whitestone, all of N.Y.

[73] Assignee: Sperry Rand Corporation, New York, N.Y.

[21] Appl. No.: 737,863

[22] Filed: Nov. 2, 1976

[51] Int. Cl.² .............................................. H04B 9/00
[52] U.S. Cl. .................................................. 250/199
[58] Field of Search ........................................ 250/199

[56] References Cited

U.S. PATENT DOCUMENTS

| | | | |
|---|---|---|---|
| 3,803,405 | 4/1974 | Ohnsorge et al. | 250/199 |
| 3,845,293 | 10/1974 | Borner | 250/199 |
| 4,027,153 | 5/1977 | Käch | 250/199 |

Primary Examiner—Richard Murray
Attorney, Agent, or Firm—Howard P. Terry; Seymour Levine

[57] ABSTRACT

An optical communication system is disclosed wherein a multiplicity of stations in a linear, random, or grid arrangement are coupled in a party-line type network in which optical signals originated by a master or responding station are relayed from station to station. Coupling between stations may be accomplished by means of optical lenses, the focal regions of which are coupled to electronic equipments that may be remotely located therefrom. This electronic equipment detects received optical signals, regenerates and retransmits these received optical signals, and originates a responding optical signal to the master station when the received optical signal is addressed to the receiving station.

11 Claims, 5 Drawing Figures

OPTICAL DATA COMMUNICATION SYSTEM

BACKGROUND OF THE INVENTION

1. Field of the Invention

The subject invention pertains to the art of communication systems and specifically to an optical communication system wherein data signals are relayed from station to station along predetermined routes.

2. Description of the Prior Art

Optical communication repeater systems generally comprise a multiplicity of repeater stations whereby communications between the central station and other stations within the system are accomplished by relaying the data from station to station. This is accomplished by supplying each station with an optical receiver which receives a signal from a station prior in line and an optical transmitter which transmits an amplified or reconstructed signal to a station subsequent in line. To provide two way reception and transmission, each station must be equipped with two such receivers and transmitters thereby enabling a dialogue between the central station and each of the outlying stations. At installation, the receivers and transmitters at each station are pointed toward transmitters and receivers of prior and subsequent stations by means of aiming telescopes sighted thereto. Generally, the alignment telescope and optical transmitter and optical receiver and the associated electronics are in a common package, and considerable effort is required to align the three elements to one another. To facilitate aiming during installation, the package is typically fitted with an external two-axis swivel or gimbal together with a fine adjusting and locking mechanism. In a typical installation, two such packages are mounted back to back on a mast to provide unobstructed lines of sight. Thus, not only are two complete units required for each station but electronic servicing difficulties are encountered due to this mast mounting. The present invention reduces costs, increases system reliability, minimizes the mast mounted equipment and installation time, and provides increased electronic serviceability.

SUMMARY OF THE INVENTION

The present invention is an optical communications system employing a multiplicity of control/surveillance stations located throughout the region in linear, grid or random arrays. Stations within the array are linked to a master station by means of party-line type network in which only one station at a time originates a message over a common communications channel, when so directed by the master station, while all other stations are serving as a repeater station. Each station in the system is assigned an address code and the master station may communicate with a designated station within the array by transmitting its address code to the nearest station, which repeats the signal to the next adjacent station. This signal repetition continues throughout the system and when the signal reaches the designated station, whereat the address signal is recognized, data signals in response thereto are emitted therefrom and returned to the master station in a similar manner. All stations receive the coded signal and repeat it to subsequent stations, but only the station designated by the transmitted code responds.

It is an object of this invention to provide an optical communication system with the ability to communicate between stations arranged in linear, grid or random arrays.

Each station in the system contains a multiplicity of optical input and output ports providing a capability for receiving and transmitting signals in a multiplicity of directions. When an optical signal is received from a given direction, it is retransmitted to adjacent stations in all available directions and it is also routed to a station electronics package wherein signal detection and decoding take place. Each station comprises an optical receiver and an optical transmitter that are remotely located from a multiplicity of mast mounted lenses which form the optical signal input/output ports.

Other objects of this invention are to minimize the equipment required and to increase maintainability in optical communication systems. In this invention, coupling between the mast mounted lenses and the off mast mounted receiver and transmitter is accomplished by means of interleaved optical fiber bundles which couple the focal point of each lens to both the receiver and transmitter. This arrangement minimizes the number of lenses, transmitters and receivers required and provides for increased maintainability by removing the electronics package from the mast, thus providing greater accessibility thereto. Other features and advantages will become apparent from the consideration of the following detailed description.

DESCRIPTION OF THE PREFERRED EMBODIMENT

Figure 1:
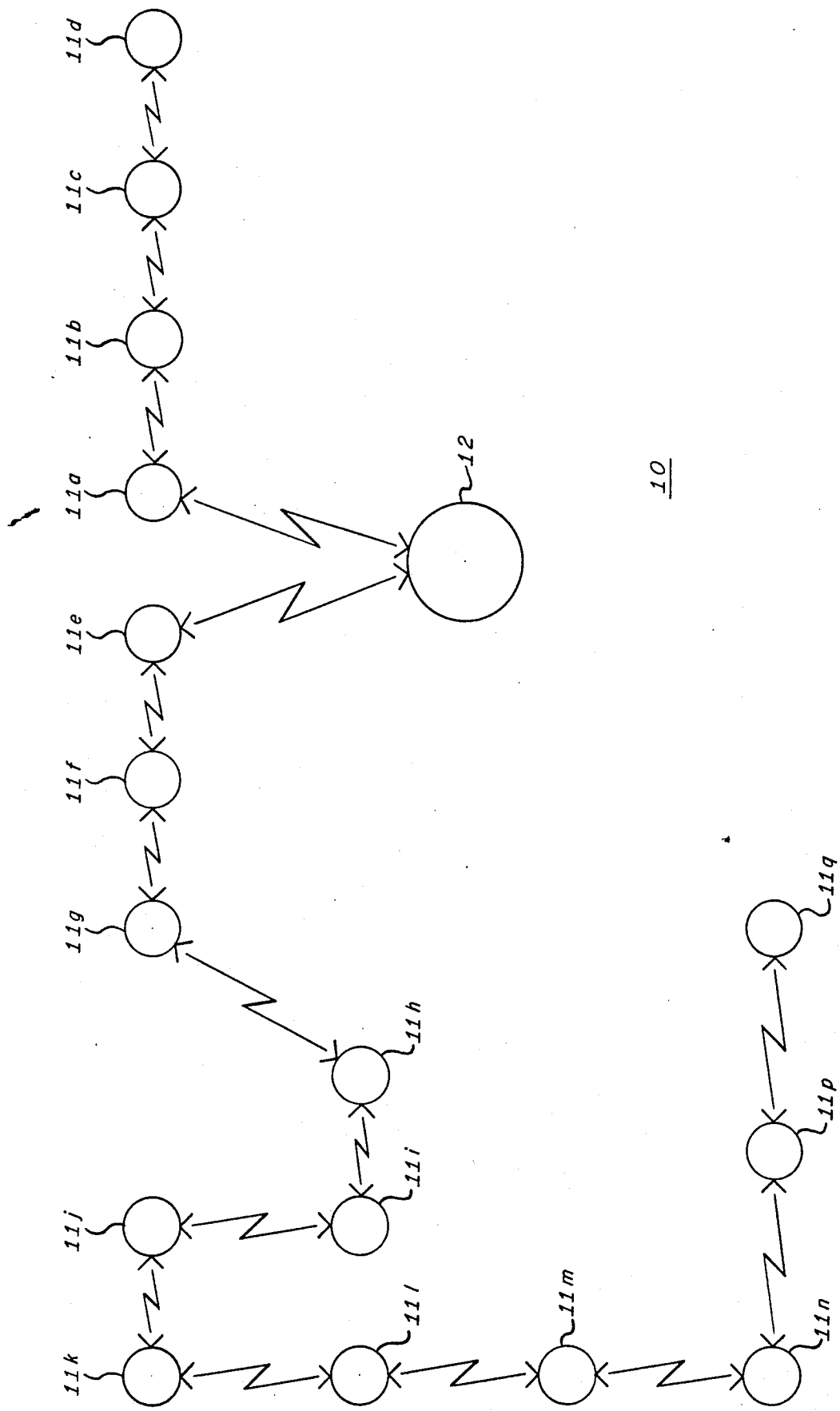
FIG. 1 is an illustration of a linear repeater communications network.

Referring to FIG. 1, wherein is shown a repeater optical communications system 10 with the repeater stations 11a through 11q positioned in a linear fashion. A master station 12 transmits a pulse coded optical signal which is the address code of one of the stations 11a through 11q, and then pauses to listen for a response from the addressed station. This signal is initially received at stations 11a and 11e wherefrom it is retransmitted to stations 11b and 11f, respectively. This process is continued until a pulse coded optical signal representative of the originally transmitted signal is received at all stations in the system. At each station, the received pulse coded signal is also routed to the station's electronic system wherein it is detected and decoded to determine whether the received pulse code is the designated address code of the station. The station addressed will respond appropriately. This response is relayed to the master station 12 via the path followed by the originally received coded signal. All other stations within the network will hear the same message, but since no other address code has been transmitted, none will originate a response but only relay the signals.

Figure 2:
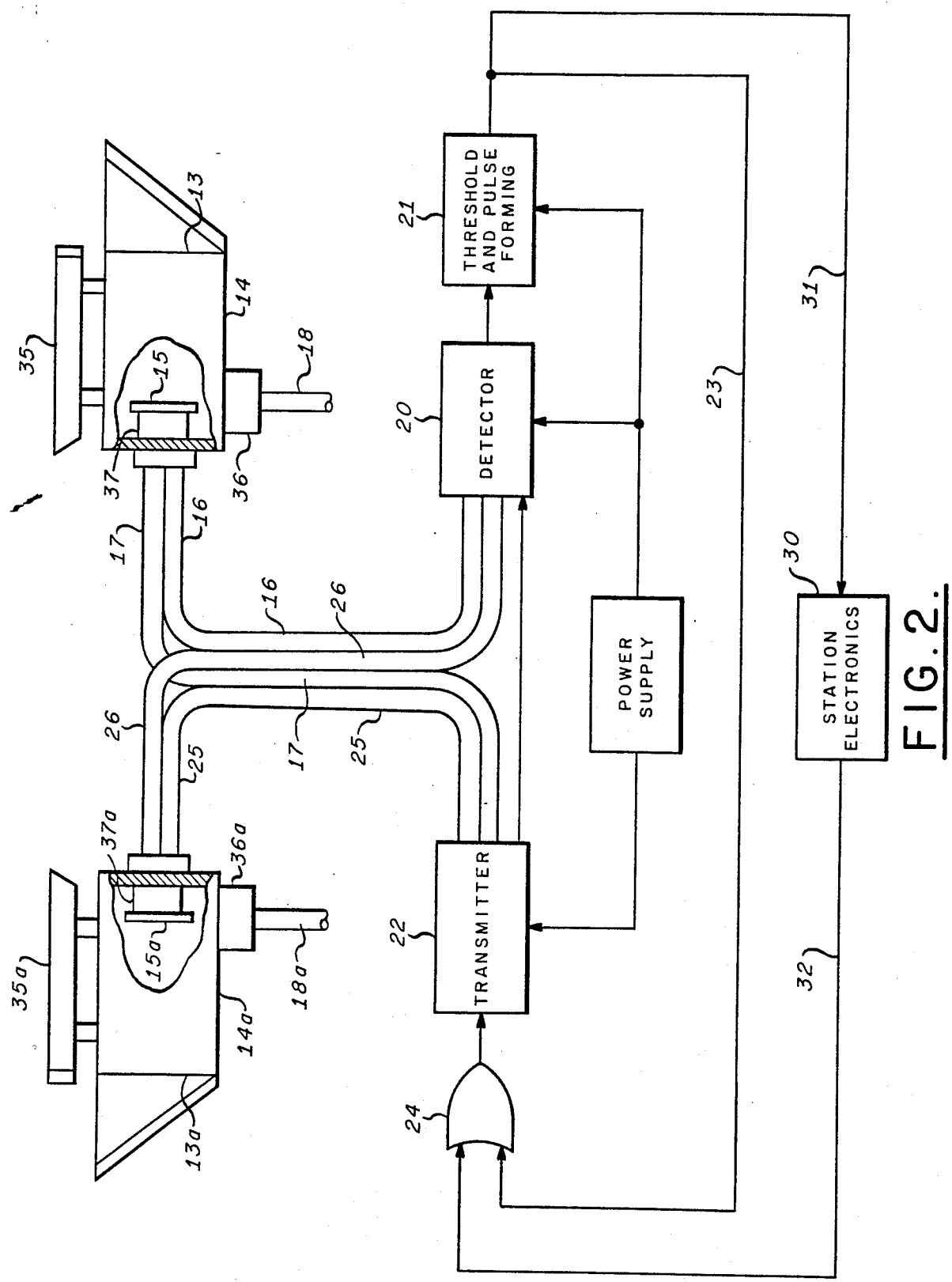
FIG. 2 is a block diagram of a repeater station contained in a linear repeater communications network.

Refer now to FIG. 2, wherein a block diagram of the equipment at each station is shown. An optical pulse of the pulse coded optical signal illuminates a lens 13 contained in housing 14 mounted on a mast 18. Lens 13 focusses this signal to a focal point 15 whereat optical fiber bundles 16 and 17 are coupled. The signal energy coupled to optical fiber bunder 16 is guided therethrough to an optical detector 20, which may be a photodiode. Detector 20 is coupled to a threshold and pulse forming network 21. Incidence of a light pulse on the optical detector 20 causes the generation of an electrical pulse at the output terminal of the threshold and pulse forming network 21. This pulse provides a trigger to transmitter 22 via line 23 and OR gate 24. Transmitter 22, which may be a laser diode, provides an optical signal a predetermined time after the coupling of the electrical trigger pulse from the threshold and pulse forming network 21. During this period of time, prior to the generation of the optical signal, an electrical signal is coupled from transmitter 22 to detector 20 which provides a stimulus for blanking detector 20 for a given period. After this period the detector is unblanked at a time sufficiently in advance of the next anticipated pulse in the pulse coded optical signal. Thus, the receiver will not receive reradiated or reflected energy resulting from the optical pulse transmitted by transmitter 22. The light pulse emitted from transmitter 22 is coupled to optical fiber bundles 17 and 25 each of which respectively guides the energy contained therein to focal points 15 and 15a which illuminate lenses 13 and 13a contained in a housing 14a which is mounted on a mast 18a, wherefrom light pulses are transmitted to the two adjacent stations in the communications network 10.

The output pulses from the threshold and pulse forming network 21, via line 31, are also coupled to the station electronics unit 30, wherein decoding is performed and a determination is made if the station has been specifically addressed by the master station. Upon determining that the station has been addressed, the station electronics unit 30 will couple a series of electrical pulses, which contain the message to be relayed to the master station, to transmitter 22 via lines 32 and OR gate 24. Transmitter 22 provides a burst of light in response to each electrical pulse received from the station electronics unit 30. These pulses are coupled via lines 17 and 25 to focal points 15 and 15a, respectively, wherefrom lenses 13 and 13a are illuminated and the optical pulses are directed to the two adjacent stations to be relayed to the master station 12.

Optical pulses may arrive from another direction and initially illuminate lens 13a, wherefrom it is focussed to focal point 15a, whereat optical fiber bundles 25 and 26 are coupled. The signal energy coupled to optical fiber bundle 26 is guided therethrough to detector 20, thereby initiating the sequence of events previously described.

The optical fiber bundles contain a multiplicity of individual optical fibers, each considerably smaller than the focal region, but collectively about the same size so that the totality of the received energy is collected by the bundle as a whole. Half of the fibers go to the detector 20 and half to the transmitter 22. The fibers are routed in an orderly way so that at the focal regions 15 and 15a the transmit and receive fibers are interleaved and uniformly distributed over the entire focal region. In this way the maximum transmitted energy is made to coincide spatially with the direction of maximum receiver sensitivity without the need for separate or complex receive and transmit lenses. This feature reduces the internal alignment complexity that such a 2-lens arrangement would entail.

Telescopes 35 and 35a, having a sighting arrangement such as used on rifles, may be affixed to each housing to provide coarse alignment of each pair of complementary lenses. Each sighting telescope may be mounted with an alignment target, to which the corresponding telescope is sighted, and each housing may be mounted on an external swivel 36, 36a, thereby allowing movement of the housing, 14, 14a - telescope 35, 35a combination until the telescope crosshairs are aligned with its corresponding target. This serves as coarse alignment of all corresponding lenses, the fine alignment for which may be accomplished by positioning the fiber bundle at the focal regions 15, 15a of one of the lenses, by means of a fiber bundle positioning mechanism 37, 37a, while light energy is emitted from the adjacent station until the received light energy is a maximum.

Fine alignment of the fiber/lens combination in typical applications requires a pointing accuracy of 0.001 radians or better. A mechanism to aim and hold the entire lens, fiber and housing assembly to this level of accuracy is necessarily heavy and cumbersome. In addition, the precision mechanism being external to the housing is exposed to weather and accidental abuse. By placing the precision portion of the aiming mechanism internal to the housing, it becomes lighter and cheaper and more immune to weather and accident effects.

An alternative alignment procedure is to replace the telescope-target combination 35, 35a at a distant adjacent station with an optical corner reflector, transmitting light energy from the lens 15, 15a at a given station and adjusting same until the retro-directed light energy received is at a maximum.

Figure 3:
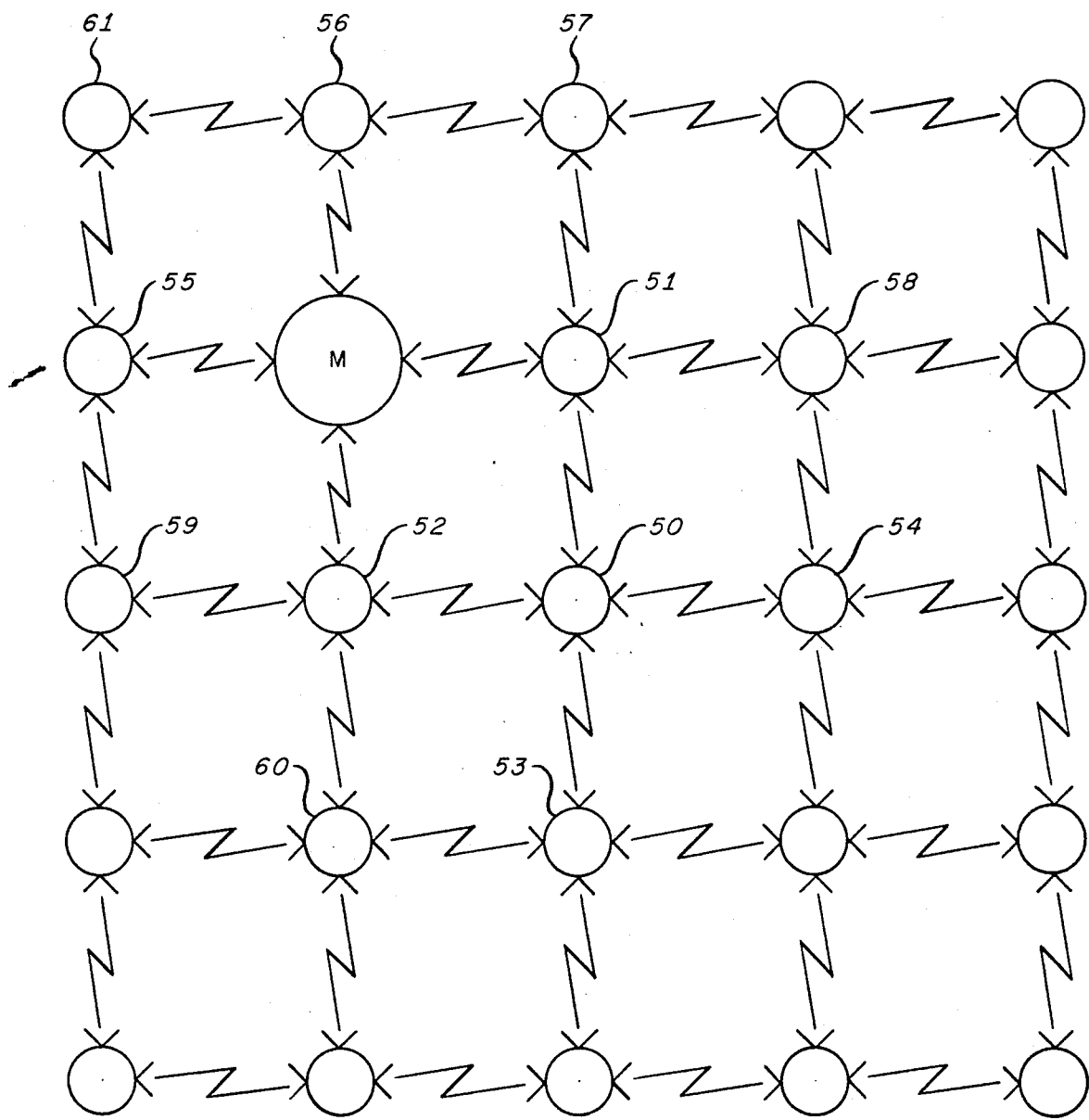
FIG. 3 is an illustration of a grid type repeater communications network.
Figure 4:
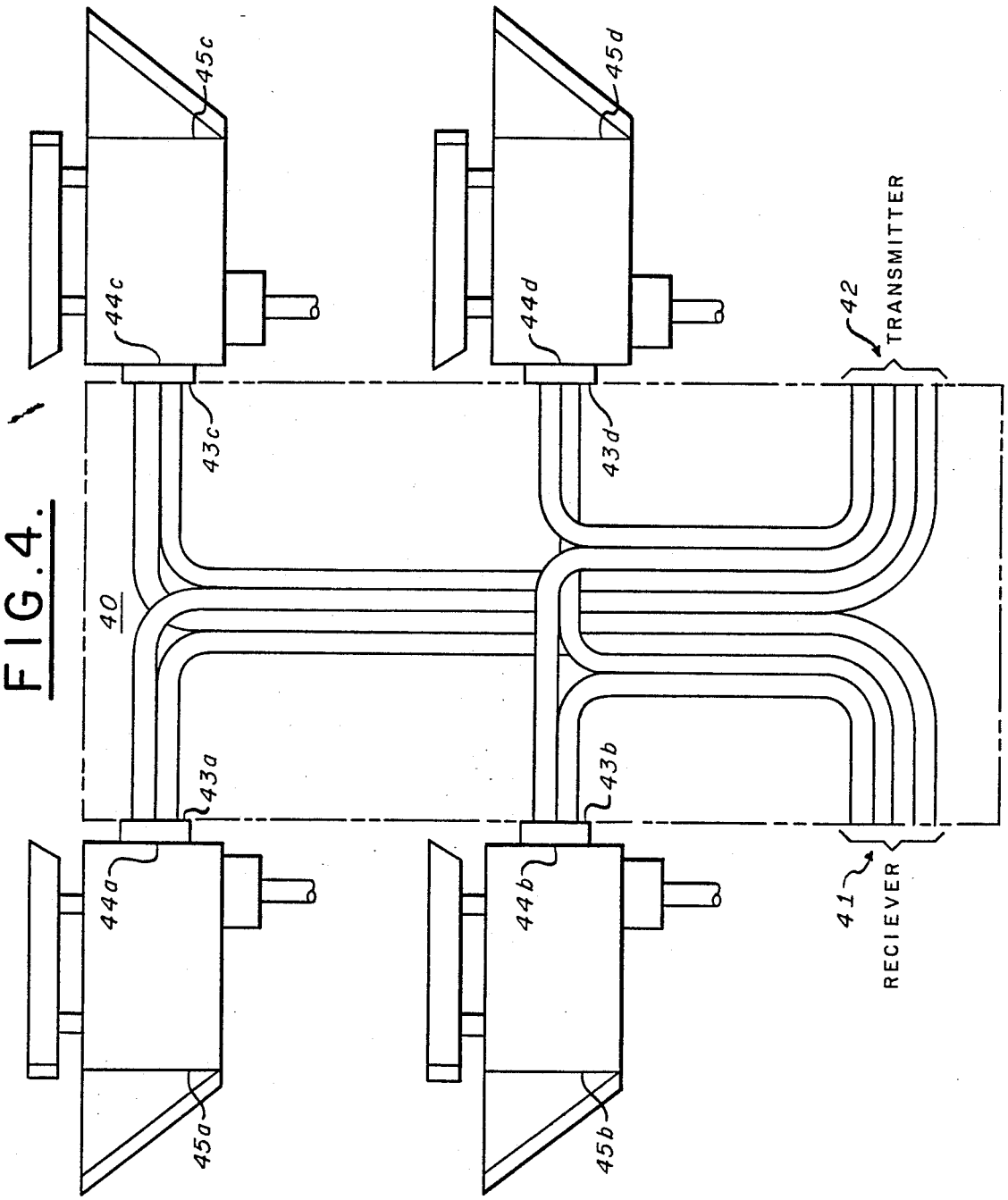
FIG. 4 illustrates the optical coupling of the transmit/receive lenses to the optical receiver and optical transmitter in a grid type repeater communications network.

As described above, the simultaneous transmission of an optical signal from each station is accomplished in a maximum of two directions, and communications at any given station network to the master station is confined to a single well defined path. If a failure should occur at a station along the line, all stations remotely located therefrom are essentially isolated from the master station. In special situations, such as a multiplicity of stations positioned collinearly along the propagation path of a light beam emitted from a previous station, a singular outage may be bridged by the reception of the beam at the station succeeding the one in which the failure occurred. Greater over-all system reliability may be obtained by providing optical beams in more than two directions as illustrated in the grid configuration shown in FIG. 3. Each interior station of the grid transmits the beam in four directions and has the capability of receiving from any of these four directions. At each station in the grid network, as in the linear array, there is a single optical receiver and a single optical transmitter, each of which is coupled to four transmit/receive lenses. Refer now to FIG. 4, wherein is shown the optical circuitry of an internal station in the grid of FIG. 3. The focal points 44a, 44b, 44c, and 44d of the lenses 45a, 45b, 45c, and 45d, respectively, are coupled to the receiver and transmitter, not shown, via interleaved fiber optical bundle 40 having six terminals 41, 42, 43a, 43b, 43c and 43d. Terminal 41 couples to the receiver, not shown, terminal 42 couples to the transmitter, not shown, and terminals 43a, 43b, 43c, and 43d to the focal points 44a, 44b, 44c and 44d, respectively. Each of the fiber bundle ports 43a, 43b, 43c and 43d may contain a multiplicity of smaller fibers uniformly interleaved as before, half of which couples the focal points 44a, 44b, 44c and 44d to the receiver while the other couples the focal points 44a, 44b, 44c and 44d to the transmitter. The transmitter, receiver and their associated circuitry are identical to that previously discussed and shown in block form in FIG. 2.

Refer again to FIG. 3. Consider station 50 which is coupled to stations 51, 52, 53 and 54. The optical receiver at station 50 will respond to the first of the signals emitted from each of the stations 51, 52, 53 and 54, and the transmitter at station 50 will transmit optical signals to stations 51, 52, 53 and 54 simultaneously. As in the linear configuration, a master station M is in control of all other stations. Though each of the stations may simultaneously receive signals, only one at a time may originate a signal and then only after being so authorized by a specific message from the master. For the master to communicate with a given station, not in its direct line of sight, other stations must receive and repeat the signal from the master passing it along from station to station throughout the network. Similarly, a response from any station is repeated through the network to its destination at the master station. As previously stated, in a linear configuration the system is vulnerable in part to the failure of a given station in that all stations more remote from the master are thereby isolated. In the grid configuration shown in FIG. 3, with four couplings at each interior station, a single or multiple station failure does not interrupt the signal flow to any other station, for there exists redundant non-interfering signal paths. As shown in FIG. 3, a signal emitted from the master station M is received at stations 51, 52, 55 and 56. In turn, these stations emit signals towards stations 50, 57 and 58; 50, 59 and 60; 59, and 61; and 57 and 61 respectively. The receiver at the master station M is blanked for a predetermined interval and optical signals emitted from stations 51, 52, 55 and 56 towards station M are not detected during this interval. The stations 50, 57 59 and 61 are on a diagonal from the master station M. Each of these stations receive signals from two adjacent stations, the first signal to arrive initiates the emission of an optical signal and blanks the optical receiver for a predetermined interval as previously described. Thus, unless the optical signals received from the two adjacent stations are separated in time by more than the predetermined interval, the diagonal stations will emit only one optical signal which is timed with respect to the first pulse to arrive. The receivers at each station are blanked after the reception of an optical pulse and remain in this condition for the interval of time required to relay this optical pulse emitted from the master station M, to all stations within the network. At the conclusion of this interval, all receivers are unblanked and stand ready to receive subsequent pulses. Signals emitted from a responding station are relayed to the master in a similar manner. It is evident from an examination of FIG. 3, that communications between the master station M and any given station within the network may be accomplished through a multiplicity of different paths. Thus, the failure of any given station in the network does not break communications between the master station and any other station.

Figure 5:
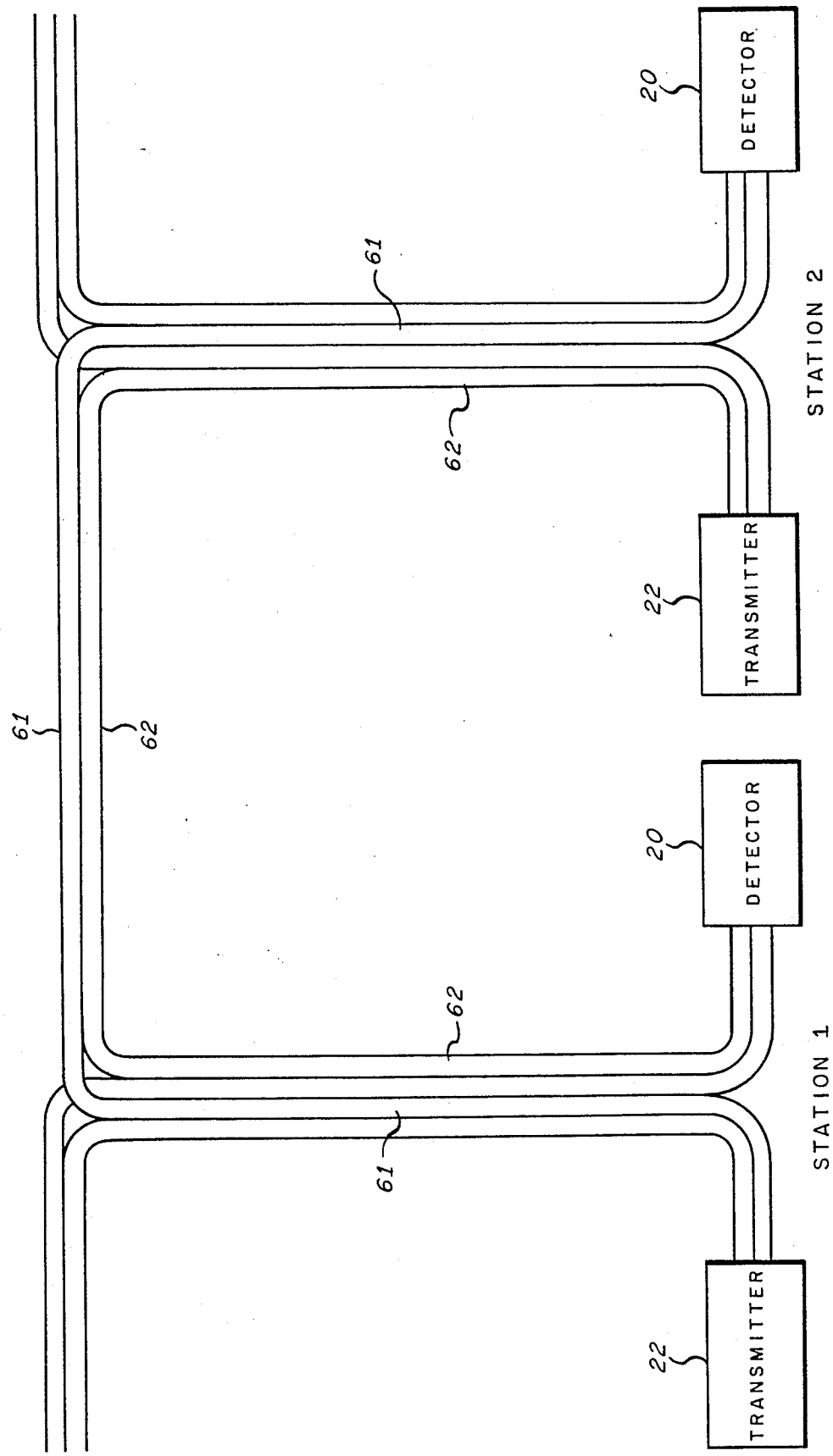
FIG. 5 is an illustration of the coupling of stations within the network by means of optical fiber bundles.

Though the invention has been described with optical lenses to couple stations within the network, it should be apparent to those skilled in the art that the lenses may be removed and the coupling between stations may be accomplished by means of optical fibers or other light guiding devices. FIG. 5 illustrates the coupling of two stations by means of optical fiber bundles. The transmitter 22 of station 1 is coupled via optical fiber 61, to the detector 20 of station 2 and the transmitter 22 of station 2 is coupled, via optical fiber 62, to the detector 20 of station 1.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An optical communications system comprising:
   a multiplicity of stations at least one of which is a master station, each having a predetermined address coded signal designated thereto;
   means at each of said stations for coupling said stations to stations adjacent thereto;
   means remotely located from said coupling means at each of said stations for generating optical signals for transmission to said adjacent stations in response to an optical signal received from one of said adjacent stations, and for generating electrical signals when said predetermined address coded signal is received; and
   an optical fiber bundle wherein optical fibers are interleaved to couple optical signals received at said coupling means from adjacent stations to said receiver-generator means and to couple signals from said receiver-generator means to said coupling means for transmission to adjacent stations.

2. An optical communications system in accordance with claim 1 wherein said receiver-generator means includes means for preventing the reception of a second optical signal for a predetermined period after the generation of an optical signal in response to the reception of a first optical signal.

3. An optical communications system in accordance with claim 1 wherein said coupling means comprises a multiplicity of means for focussing optical energy to a predetermined focal region and for transmitting optical energy emanating from said focal region in a preselected direction, each of said focal regions being coupled to said receiver-generator means by said optical fiber bundle.

4. An optical communications system in accordance with claim 3 further including means coupled to each of said optical focussing means for aligning each of said optical focussing means with an adjacent complementary focussing means.

5. An optical communications system in accordance with claim 4 wherein an optical fiber bundle positioning means is coupled to said optical fiber bundle at each of said focal regions for positioning said optical fiber bundle thereto to provide for a fine alignment of said optical focussing means with said adjacent complementary focussing means.

6. An optical communications system in accordance with claim 3 wherein an optical retrodirective means is attached to said adjacent complementary focussing means whereby an optical signal radiated from said optical focussing means illuminates said optical retrodirective means causing an optical signal to be returned thereto, said optical focussing means being then positioned until said returned signal is maximized, thereby establishing the alignment of said optical focussing means and said adjacent complementary focussing means.

7. An optical communications system in accordance with claim 1 wherein said coupling means comprises means coupled to said optical fiber bundle for guiding optical signals between said receiver-generator means at one station of said multiplicity of stations and said receiver-generator means at stations adjacent thereto.

8. An optical communications system in accordance with claim 7 wherein said receiver-generator means comprises:
   means responsive to optical signals coupled from said optical signal guiding means for converting optical signals to electrical signals; and
   means responsive to electrical signals coupled from said optical-electrical converter means for converting electrical signals to optical signals, which are thereafter coupled to said optical signal guiding means.

9. An optical communications system in accordance with claim 8 further including means coupled between said electrical-optical converter means and said optical-electrical converter means for preventing said optical-electrical converter means from responding to a second received optical signal for a predetermined period after said electrical-optical converter means has generated an optical signal in response to an electrical signal coupled from said optical-electrical converter means in response to a first received optical signal.

10. An optical communications system in accordance with claim 3 wherein said receiver-generator means comprises:
   means coupled to said focal region of each of said multiplicity of said optical energy focussing means for converting optical signals illuminating said focal region to electrical signals; and
   means coupled to receive said electrical signal from said optical-electrical converter means for converting said electrical signals to optical signals which are coupled by said optical fiber bundle to said focal region of each of said multiplicity of said optical energy focussing means.

11. An optical communications system in accordance with claim 10 further including means coupled between said electrical-optical converter means and said optical-electrical converter means for preventing said optical-electrical converter means from responding to a second received optical signal for a predetermined period after said electrical-optical converter means has generated an optical signal in response to an electrical signal coupled from said optical-electrical converter means in response to a first received optical signal.

* * * * *